United States Patent [19]

Gogniat

[11] E Patent Number: Re. 32,617

[45] Reissued Date of Patent: Mar. 1, 1988

[54] WATCHCASE

[75] Inventor: Paul Gogniat, Bienne, Switzerland

[73] Assignee: Montres Rado S.A., Longeau, Switzerland

[21] Appl. No.: 858,730

[22] Filed: May 2, 1986

Related U.S. Patent Documents

Reissue of:

[64] Patent No.: 4,490,052
Issued: Dec. 25, 1984
Appl. No.: 379,360
Filed: May 18, 1982

[30] Foreign Application Priority Data

Jun. 1, 1981 [CH] Switzerland ..... 3557/81

[51] Int. Cl.[4] ..... G04B 37/00

[52] U.S. Cl. ..... 368/292; 368/291; 368/294

[58] Field of Search ..... 368/291-296, 368/300, 276, 286; 29/177, 179

[56] References Cited

U.S. PATENT DOCUMENTS

| | | | |
|---|---|---|---|
| 1,446,952 | 2/1923 | Wadsworth | 368/294 |
| 1,722,514 | 7/1929 | Zullo | 368/294 |
| 3,382,666 | 5/1968 | Gerry | 368/294 |
| 3,729,924 | 5/1973 | Aoki | 368/294 |
| 4,198,811 | 4/1980 | Ratajski | 368/294 |
| 4,464,063 | 8/1984 | Gogniat | 368/294 |
| 4,493,562 | 1/1985 | Gagnebin | 368/294 |

FOREIGN PATENT DOCUMENTS

| | | | |
|---|---|---|---|
| 653895 | 3/1929 | France | 368/296 |
| 2251044 | 11/1978 | France | 368/291 |
| 132072 | 3/1929 | Switzerland | 368/296 |
| 206230 | 10/1939 | Switzerland | 368/291 |
| 347780 | 8/1960 | Switzerland | 368/294 |

*Primary Examiner*—Bernard Roskoski
*Attorney, Agent, or Firm*—Peter L. Berger

[57] ABSTRACT

A watch (1) comprising essentially a body (15) to the top surface of which is held a flat crystal (2) by means of fixation members (4) providing grooves in which the edges of the crystal are secured after having been laterally engaged therein, and a sealing strip against the perimeter of the bottom face (11) of the crystal. The grooves of the fixation members (4) are bounded by two facing surfaces between which the crystal is engaged, the top groove surface (6) bearing against the top face (8) of the crystal. The case further comprises means (12) for applying the sealing strip (1) against the bottom face (11) of the crystal only after the crystal has been engaged in the grooves.

10 Claims, 4 Drawing Figures

WATCHCASE

Matter enclosed in heavy brackets [ ] appears in the original patent but forms no part of this reissue specification; matter printed in italics indicates the additions made by reissue.

BACKGROUND OF THE INVENTION

The present invention relates to a watchcase, and more specifically to means for fixing a watch crystal to the top of the body of a watchcase.

There are many known devices for tightly and removably fixing a flat crystal to the top of the body, said crystal extending, at least over a portion of its periphery, to the very edge of the body on which its lower face rests.

For example, Swiss Pat. No. 592,911 describes a sealed watchcase of a rectangular shape in which the crystal is held by two parallel tracks formed at opposite sides of the case. These tracks form dihedral angles, the top surface of which bears against the bevel edge of the crystal. During assembly, a sealing strip positioned by hand is dropped into the top opening of the body, and the crystal is then slipped literally into the tracks. As the crystal is laterally engaged, the sealing strip is gradually compressed. Thereafter it exerts an axial pressure on the crystal, pressing it firmly against the upper track surface.

This arrangement, however, has several disadvantages including the risk of damaging or displacing the seal while the crystal is being slipped over it by bearing down on it to engage the crystal in the tracks. This difficulty has been resolved in another type of watchcase described in applicant's European Patent Application 0,006,077, (U.S. Pat. No. 4,198,811) where the crystal is retained on two opposite sides in projecting portions of the case between which it is engaged from above, thus compressing a sealing strip. Then the crystal is secured by cylindrical pins inserted laterally in matching holes made half in the case and half in the bevel of the crystal.

A common feature of these various solutions is that the edge of the crystal is involved in its attachment to the body, and this obviously limits the possibility of these solutions with very thin crystals, for example between 0.5 and 0.8 mm in thickness. In these various embodiments, it is necessary at the time of assembly, in order to compress the seal to subject the crystal to an axial pressure at least as great as that by which it is desired that the seal shall afterwards bear against the crystal. This presents a serious risk of breaking a very thin crystal when inserting it if this pressure is too great or of obtaining an imperfect seal otherwise.

Lastly, in these known solutions, the sealing strip in the assembled state of the case is always slanted radially inward with respect to the surface of contact between the crystal and the fixation members. This slant presents no problem with comparatively thick and rigid crystals, but the bending stress it generates may subject very thin crystals to a strain at the surfaces of contact resulting in a poor seal where the edges of the crystal are not provided with fixation members.

An object of the invention, then, is to propose a novel watchcase design of the above-mentioned type, in which the crystal may be engaged laterally in fixation members providing grooves, but in which it is not necessary to subject it to axial pressure at the time of assembly, and in which the crystal is held not by its edge but by its upper face. This construction is especially well suited to the fixing of very thin crystals and to protecting their vulnerable areas, such as their corners in the case of crystals of polygonal shape, against physical shock.

BRIEF DESCRIPTION OF THE DRAWING

The invention may be understood by a reading of the following description, given with reference to the accompanying drawings, in which.

DETAILED DESCRIPTION

Figure 1:
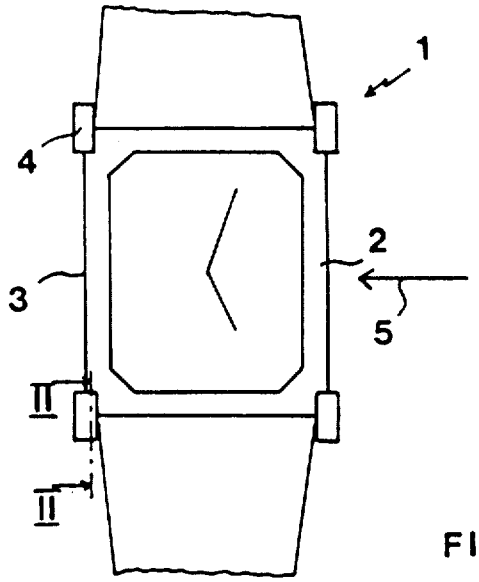
FIG. 1 is a top view of a watchcase according to one embodiment of the invention.

As seen in FIG. 1, the watchcase 1 comprises essentially a thin crystal 2, for example, made of sapphire mounted on the top of the body so that the portions 3 of its periphery extend to the very edge of the body. This crystal 2 is secured to the body by fixation members 4 having grooves in which the crystal may be engaged laterally in the direction of the arrow 5. The fixation members 4 consist of clips arranged at the corners of the case 1 which is rectangular in shape, and in order to protect the crystal, especially if the watch falls on a hard surface, they extend laterally beyond the edges of the crystal 2.

Figure 2:
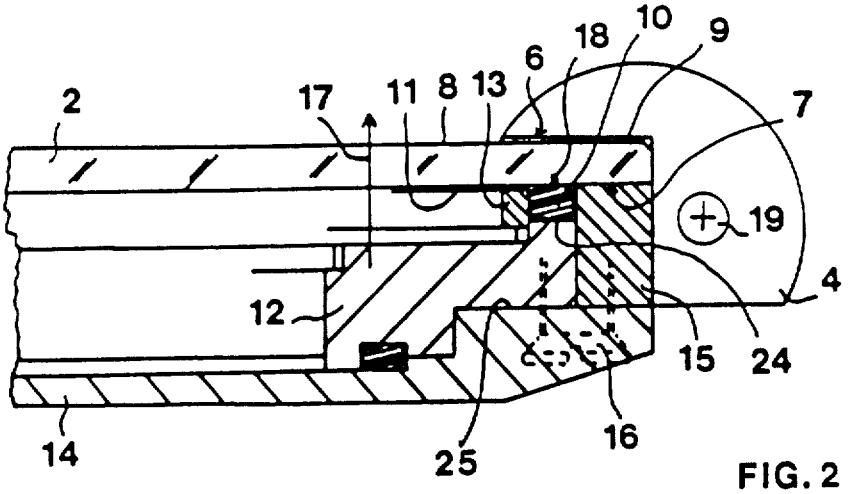
FIG. 2 is a sectional view along line II—II in the case of FIG. 1.

The sectional view in FIG. 2 shows how the groove made in the fixation member 4 is formed by two facing surfaces 6 and 7 between which the crystal 2 is engaged. The top groove surface 6 bears against the top face 8 of the crystal 2 by way of a thin strip 9 of elastic material placed in between, the effect of which is to avoid breakage of the crystal by absorbing any shocks. The fixation member 4 overreaching the crystal 2 likewise protects it from direct impact.

A sealing strip 10 is to be applied against the bottom face 11 of the crystal 2, but only after the latter has been engaged in the groove. To this end, the seal 10 is laid on a supporting surface 24 comprising the top of a retaining ring 12 located behind the bezel 13. The retaining ring 12 likewise has a bearing surface 25 underneath, cooperating with a corresponding surface on the back 14 so that the placement of the back 14 on the body 15 by means of screws 16 will thrust the retaining ring 12 towards the crystal 2 in the direction of the arrow 17, thus ensuring a uniform bearing of the seal 10 against the bottom face 11 of the crystal 2. Preferably the area of contact 18 between seal 10 and crystal 2 is located facing the area of contact between said crystal and the top groove surface 8 so as to impose only an axial compression on the crystal at this point and avoid any deformation of the crystal edges not held by fixation members 4.

Preferably the connecting members 4 are integral with the body 15, and they have a portion which, projecting beyond the side walls of the latter, forms lugs for attachment of a band by means of a spring bar engaged in holes 19.

To assemble the case according to the invention, crystal 2 is engaged in the grooves of the fixation members 4 before tightening up the back 14 with screws 16 so that the seal 10 will not interfere with insertion of the crystal 2 and no force other than a slight lateral thrust need be applied to the latter. Then the back 14 is attached to the body 15 drawing the retaining ring 12 and hence the seal 10 upward against the crystal 2. Given this arrangement of the several parts, a high compression of the seal can thus be obtained without danger of breaking the crystal.

Figure 3:
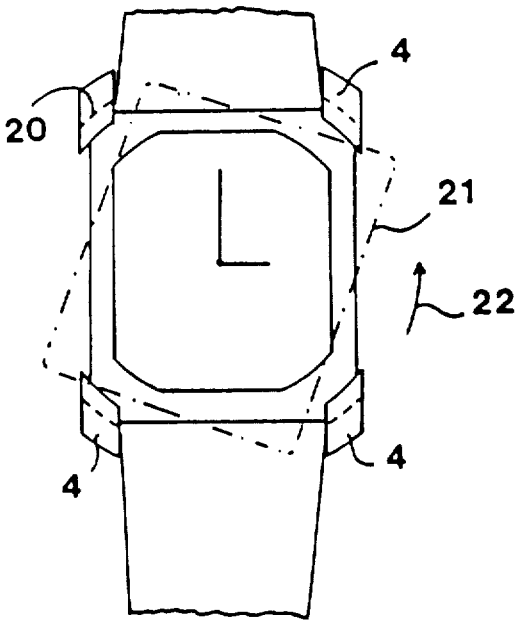
FIGS. 3 and 4, similar to FIG. 1, show two other embodiments of the invention.

In the embodiment of FIG. 3, the walls of the grooves in the fixation members 4 represented by dotted lines 20 follow a circular arc, the crystal 2 being then engaged in them from an introductory position represented by the dot-dash lines 21 by a rotation in the direction of the arrow 22.

Figure 4:
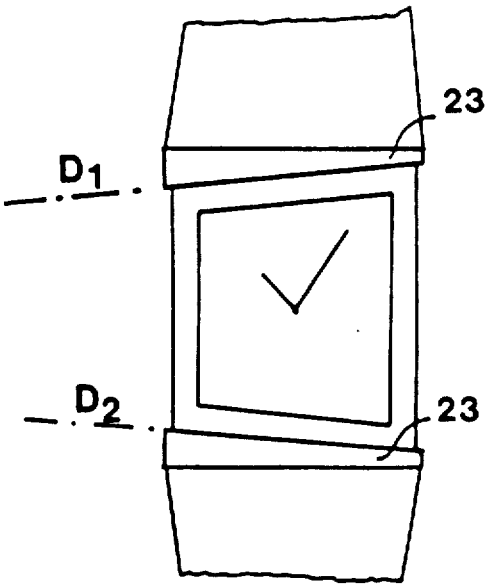

As a modification, FIG. 4 shows a watchcase in which the clips of FIGS. 1 to 3, arranged at the corners of the case, are replaced by straight tracks 23 extending continuously between two opposed edges of the body in two directions $D_1$, $D_2$. These directions may either be converging, as indicated in the figure, or parallel.

Although it has been described in terms of a few embodiments only, the invention is capable of numerous modifications and variants that will suggest themselves to one skilled in the art.

What is claimed is:

1. A watchcase assembly for attaching a thin [flat] crystal to the watchcase, said crystal being substantially coextensive with said watchcase, said assembly comprising a plurality of separate fixation members attaching the watchcase to the crystal, said fixation members each having inwardly directed grooves sized to receive the edges of the crystal, said grooves comprising parallel facing surfaces spaced apart a distance slightly greater than the thickness of said thin [flat] crystal to engage said crystal, a sealing strip applied against the perimeter of the lower face of the crystal in the region of said fixation member, the upper face of said parallel facing surfaces bearing against the upper face of the crystal, the area of contact at the fixation member between the sealing strip and the lower face of the crystal and between the upper surface of said facing surface and the upper face of the crystal being vertically aligned with each other, the dimensions of the fixation member being substantially smaller than the corresponding dimensions of the crystal, further comprising a retaining ring comprising at the top thereof a bearing surface for the sealing strip and means for thrusting the retaining ring towards the crystal thus pressing said sealing strip against the [inner] *lower* face of the crystal.

2. A watchcase according to [either of] claim 1, wherein said retaining ring comprises at the bottom thereof a bearing surface, and said watchcase further comprising a back of said case, said back thrusting the retaining ring towards the crystal to press the seal against the [inner] *lower* face of the crystal.

3. A watchcase according to claim 2, further comprising screws holding said back to the body.

4. A watchcase according to claim 1, wherein the fixation members extend laterally beyond the edges of the crystal.

5. A watchcase according to claim 1, wherein said watchcase comprises a polygonal shape, and said fixation members comprising clips arranged at the corners of the case.

6. A watchcase according to claim 1, wherein said fixation members comprise a back wall, said back wall forming a circular arc, the crystal being laterally engaged therein by rotation.

7. A watchcase according to claim 5, wherein said clips comprise a portion projecting beyond the side walls of the body forming wedges for attachment of a band.

8. A watchcase according to claim 6, wherein said clips comprise a portion projecting beyond the side walls of the body forming wedges for attachment of a band.

9. A watchcase according to claim 1, further comprising a strip of elastic material inserted between the upper groove surface and the facing portions of the upper face of the crystal.

*10. A watchcase according to claim 1, wherein said upper face of said crystal lies only in a first plane, said lower face of said crystal lies only in a second plane, and said first and second planes are parallel to each other.*

• • • • •